Patented Nov. 26, 1929

1,736,800

UNITED STATES PATENT OFFICE

HANS RATHJE, OF BUFFALO, NEW YORK

COMPOSITION FOR REMOVING BOILER SCALE

No Drawing.	Application filed January 12, 1928. Serial No. 246,150.

My invention is an improved composition devised for the purpose of removing scale or other incrustations from boilers.

I find from actual experimentations extending over a considerable period of time that the best results can be accomplished by using, in liquid form, a composition composed of potatoes, cabbage, carrots, turnips, celery, caustic soda, kerosene, graphite and water in the following proportions, to wit: For 1000 pounds of fluid composition I take:

250 pounds potatoes
125 pounds cabbage
75 pounds carrots
50 pounds turnips
25 pounds celery
125 pounds caustic soda (76%)
17 pounds kerosene
1 pound graphite and enough water to bring the mass up to 1000 pounds.

The ingredients are placed in a suitable cooker and boiled from six to twelve hours at a low pressure until the solids become dissolved.

This composition is then fed into the boiler in such quantity as may be necessary (depending upon the condition of the boiler) and as often as necessary in order to thoroughly clean the boiler, i. e., remove the scale, mud, etc. As for example, in a boiler of ten thousand gallon capacity I use from five to ten gallons of my compound, continuing the treatment at intervals if necessary until the scale is practically all removed.

From experience I have found that when my invention is used the compound cuts the scale from the surfaces of the boiler tubes and walls, without, however, injuring the boiler tubes and walls in any way. It also has a tendency to stop small leaks in the boiler.

I have treated boilers which were covered with mud and scale to a thickness of more than one-half inch and have succeeded in eliminating the mud entirely and reducing the scale to a thickness of less than one-sixteenth of an inch in a period of four months. The scale comes off in flakes and sometimes in tubes and strips from twelve to eighteen inches long, leaving the iron clear.

That my compound will not injure the boiler iron I have demonstrated by taking a piece of clean iron red hot and immersing it in a suitable quantity of my compound, leaving the iron immersed as much as three weeks, at the end of which time the iron was removed and found to be darkened slightly but no evidence of rust appeared thereon.

The use of the graphite ingredient in my compound gives to the cleaned surface of the boiler a thin film that tends to prevent boiler scale from again adhering to the surface of the boiler.

I am aware that prior to my invention various compounds have been suggested for the same purpose but so far as I have been able to learn none of them with which I am familiar have succeeded in producing the result which I have been able to produce by the use of my compound. Most of those compositions used heretofore contain active ingredients which frequently injure the boiler.

From the foregoing description it is thought that my invention will be clear to those skilled in the art.

What I claim is:

A compound composed of the following ingredients in substantially the proportions stated and brought into solution by the application of heat, to-wit: 250 pounds potatoes, 125 pounds cabbage, 75 pounds carrots, 50 pounds turnips, 25 pounds celery, 125 pounds caustic soda (76%), 17 pounds kerosene, 1 pound graphite, and enough water to make up 1000 pounds.

HANS RATHJE.